United States Patent Office.
NATHAN WRIGHT, OF JERSEY CITY, NEW JERSEY.
Letters Patent No. 61,499, dated January 22, 1867.
---
IMPROVED TOOL FOR CUTTING OFF BOILER TUBES.
---
The Schedule referred to in these Letters Patent and making part of the same.

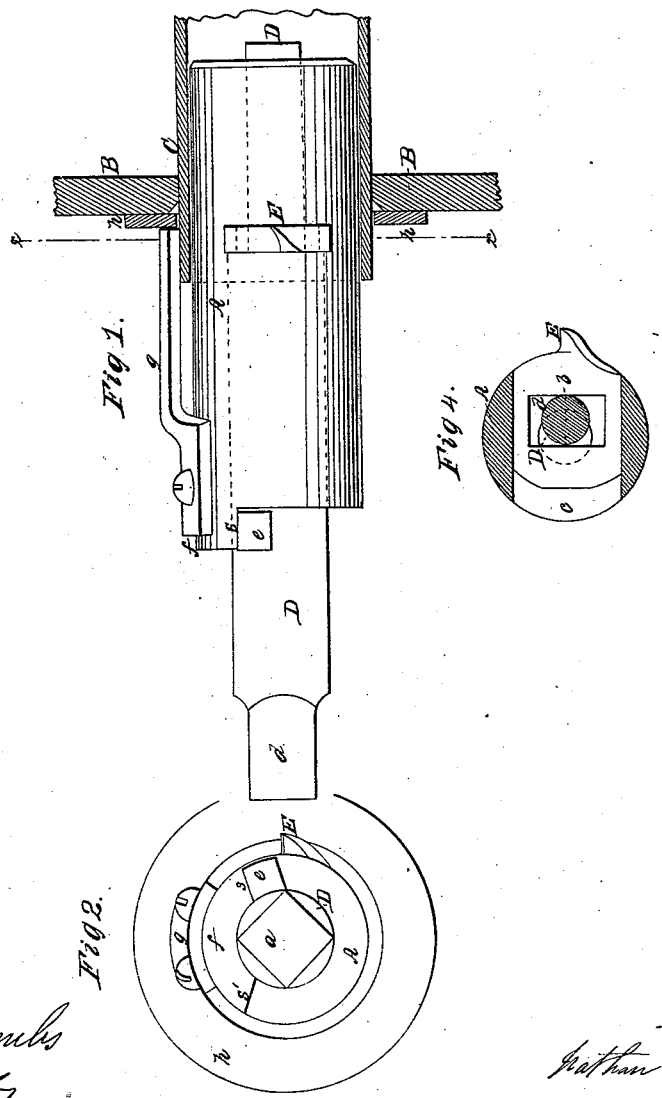

direction) of the stop $f$, the shaft, mandrel and all, will then be carried round together, the cutter which projects through the tube shearing the latter all round as the entire tool is so turned. In this way a clean and expeditious cut is effected.

What I claim as my invention, and desire to secure by Letters Patent, is—

A tool for dividing or cutting off boiler and other tubes, constructed substantially as described, or in any other equivalent manner, so that a thrusting cut is given to the tool, and whereby the continuance of the same action that thrusts the cutter through the tube also serves to complete the operation of severing the same by a draw cut, essentially as specified.

NATHAN WRIGHT.

Witnesses:
   A. LE CLERC,
   J. W. COOMBS.